United States Patent [19]

Schoeyer et al.

[11] Patent Number: 5,113,763

[45] Date of Patent: May 19, 1992

[54] CONSUMABLE IGNITER FOR A SOLID ROCKET MOTOR

[75] Inventors: Herman F. R. Schoeyer, Noordwijk, Netherlands; Guido Borso; Salvatore Gibilisco, both of Rome, Italy

[73] Assignee: Agence Spatiale Europeenne, Paris, France

[21] Appl. No.: 583,836

[22] Filed: Sep. 17, 1990

[30] Foreign Application Priority Data

Sep. 19, 1989 [FR] France .................. 89 12255

[51] Int. Cl.⁵ ........................................... F42B 17/00
[52] U.S. Cl. ................... 102/202; 60/39.823; 60/256
[58] Field of Search ............ 102/202, 287, 291; 60/39.823, 256, 253

[56] References Cited

U.S. PATENT DOCUMENTS

| | | | |
|---|---|---|---|
| 2,693,757 | 11/1954 | Brandt | 60/256 |
| 2,952,876 | 9/1960 | Miles | 60/253 |
| 3,048,968 | 8/1962 | Hutchinson | 60/256 |
| 3,103,784 | 9/1963 | Vetter et al. | 60/271 |
| 3,392,673 | 7/1968 | King | 102/202 |
| 3,570,364 | 3/1971 | Thibodaux, Jr. | 102/287 |
| 3,855,789 | 12/1974 | Platzek | 60/253 |
| 4,080,901 | 3/1978 | Heier et al. | 102/202 |
| 4,311,005 | 1/1982 | Hurd, Jr. et al. | 60/253 |
| 4,498,292 | 2/1985 | White | 60/256 |
| 4,911,795 | 3/1990 | Olliff, Jr. | 60/219 |

FOREIGN PATENT DOCUMENTS

| | | | |
|---|---|---|---|
| 60-19951 | 2/1985 | Japan | 60/256 |
| 62-299531 | 12/1987 | Japan | |
| 62-299532 | 12/1987 | Japan | |

Primary Examiner—Stephen Johnson
Attorney, Agent, or Firm—Bell, Seltzer, Park & Gibson

[57] ABSTRACT

A consumable igniter for a solid rocket motor comprises a substantially spherical reinforced thin case (111) and a combustible charge, in the form of a layer (112), lining the internal surface of the case, with the combustible charge and the case defining a combustion chamber (113). A plurality of through-holes are formed in the case defining respective sonic throats. At least one small container (120) is received in one of the through-holes and projects inwardly toward the combustion chamber (113), the container containing a charge (121) for igniting the combustible charge layer (112) of the igniter (110). An ignition device (125) penetrates into the small container for igniting the charge contained within the small container.

2 Claims, 6 Drawing Sheets

CONSUMABLE IGNITER FOR A SOLID ROCKET MOTOR

BACKGROUND OF THE INVENTION

The present invention relates to a consumable pyrogen igniter (or ignition device) for a solid rocket motor.

The purpose of an igniter of the abovementioned type is:

to ignite the solid rocket motor;

to avoid any overpressure which may be created during ignition or as a result of ignition;

to ignite the solid propellant in such a manner as to establish a uniform increase in the pressure, i.e. to avoid any pressure oscillation;

to complete the ignition in a few tenths of a second (normally within a period of time less than 100 ms or at most 200 ms).

Solid rocket motors are ignited either by a pyrotechnic igniter or by a pyrogen igniter.

Pyrotechnic igniters act in such a way as to direct onto the surface of the solid propellant of the rocket motor very hot particles which, in their turn, ignite the solid propellant. The combustion of this solid propellant has to achieve the pressurization of the rocket motor.

Pyrogen igniters contain a "gas generator". The very hot gas originating from this "generator" is intended to raise the pressure of the rocket motor. In addition to the emission of very hot gas, pyrogen igniters, just like pyrotechnic igniters, often direct very hot particles onto the surface of the solid propellant of the rocket motor in order to improve the ignition.

An essential difference between pyrotechnic and pyrogen igniters consists in that the latter contain one or more small passages which, as long as the pressure in the rocket motor is sufficiently low, act as "sonic throats", so as to decouple (at least initially) the igniter combustion process from the combustion process of the rocket motor.

Every igniter comprises the following components: an initiator (or initiator device), which can be activated electrically, but which may alternatively be activated mechanically;

a transfer device for the flame for initiating the ignition (or ignition device) which, in its simplest construction, consists of a passage permitting the hot product originating from the combustion or from the detonation of the initiator to pass along so as to reach the igniter. Frequently, this transfer device may comprise a plurality of components and, in many applications, it is possible to provide, for reasons of safety (i.e. to avoid an ignition due to human intervention errors), means for interrupting the transfer, which means consist of a safety and armament case (SAFE/ARM).

The transfer of the flame for initiating the ignition may be obtained by means of detonating cords, fast burning ignition cords, shock wave or through bulkhead initiators (TBI) or any similar pyrotechnic means capable of permitting the transfer of the flame for initiating the ignition. Moreover, the transfer device may further contain a "boost" device to ignite the igniter. Such a "boost" device may consist of a small container with a (pyrotechnic) charge, such as a ground propellant, BKNO3 pellets or any similar pyrotechnic agent. The igniter comprises a case which is fully or partially filled either with a pyrotechnic mixture (in the case of a pyrotechnic igniter) or with propellant (in some cases together with one or more pyrotechnic mixtures). The case contains one or more holes through which the combustion products enter the cavity of the rocket motor.

In the prior art, the case of an igniter is normally made of metal and, on some occasions, is integrated with the case of the rocket motor or the nozzle. In certain cases, the igniter is of the demountable type.

During rocket motor combustion, fragments of the case of the igniter are sometimes expelled through the nozzle of the rocket motor, thus damaging this nozzle or other parts of the rocket motor. To prevent this, the igniter is in most cases protected by a thermal insulation. It should be emphasized that, where the igniter is integrated with the components of the rocket motor, this may result in an increase in the mass of the system since, in the case where such an integration is performed, it is necessary to take special precautions with regard to construction, strength, heat transfer and any possible undesired interaction between the "empty" igniter—i.e. an igniter whose combustible charge has been entirely consumed, so as to leave a (resonant) cavity empty—and the rocket motor during the operation of the latter. The demountable igniter referred to hereinabove requires special means for fixing it inside the rocket motor; this is difficult in the case of modern spherical rocket motors, and frequently demands the adoption of special constructions in order to obtain a gastight closure. Measures also have to be taken to avoid any interaction between the "empty" igniter referred to above and the rocket motor during the operation of the latter.

Pyrotechnic igniters in current use comprise a metal case (sometimes thermally insulated) containing a pyrotechnic mixture. This metal case contains one or more passages through which very hot particles are directed towards the surface of the propellant to be ignited.

The pyrogen igniter is especially suitable, by reason of its characteristics, for rocket motors having a small initial free volume as well as a cylindrical geometry and a fast burning propellant, as are frequently found in military applications The pyrogen igniter is also especially suitable for mounting in the head (or head end) of the rocket motor, as the propellant ignited near the igniter may, on account of the transfer of the flame, ignite the remainder of the propellant. Most pyrogen igniters are demountable and screwed into the head end of the rocket motor.

In view of the fact that, most of the time, it is necessary to prevent the pyrogen igniters from being ejected through the nozzle, they are of a heavy construction, which consequently gives rise to an increase in the mass of the system as a whole. Pyrogen igniters may be integrated in the submerged part (i.e. in the part which projects into the cavity of the rocket motor) of the nozzle (as, for example, in the case of the Italian satellite IRIS), but may also be mounted in the head end of the rocket motor (as, for example, in the case of the European geostationary apogee motor, MAGE, which is a large cylindrical booster apogee motor developed for European satellites). In each case, a special layout has to be provided to mount or integrate the igniter and it is necessary to take precautions to ensure that no unacceptable "hot spot" occurs, the adoption of these precautions again leading to an increase in the mass of the system. If the pyrogen igniter (and in some cases also the pyrotechnic igniter) is expelled through the nozzle, after it has ignited the rocket motor, special precautions also have to be taken to avoid the temporary blockage of the nozzle and/or damage to this nozzle. Furthermore, other precautions have to be taken to ensure that the metal parts do not damage the combustion surface of the solid propellant.

The pyrogen and pyrotechnic igniters of the type integrated with components of the rocket motor or mounted separately in the rocket motor are systematically used in rocket motors intended for military and space applications, although for space applications and for modern rocket motors there is a strong preference for pyrogen igniters.

The typical arrangement of a pyrogen igniter in a modern solid rocket motor for space craft propulsion is illustrated in FIG. 1, in which the following reference numerals designate the components indicated:

1. the solid propellant of the rocket motor;
2. the polar fitting of the ignition device;
3. the igniter, which is demountable and mounted on the head end of the rocket motor;
4. the shock wave or through bulkhead initiator;
5. the rigid explosive transfer line;
6. the flexible explosive transfer line.

The layout of a typical metal pyrogen igniter is illustrated in FIG. 2, in which the following reference numerals designate the components indicated:

7. the thermal protection;
8. the metal case of the combustible charge of the igniter;
9. the pyrogen combustible charge;
10. the threaded ring;
11. the front cover of the combustible charge;
12. the seal;
13. the pressurization valve;
14. the thermal protection of the cover;
15. the cover;
16. the shock wave or through bulkhead initiator;
17. the rigid explosive transfer line;
18. the end cover of the combustible charge;
19. the nozzle inlet.

A consumable pyrogen igniter is described in the U.S. Pat. No. 3,392,673 (KING). This igniter, which is intended for a rocket motor having a solid propellant with a longitudinal central perforation, comprises:

a) a tubular case, comprising a thin layer of glass cloth impregnated with resin and a relatively thick external reinforcing layer made of a combustible material impregnated with an oxidizing agent, the latter permitting the combustion of the tubular external reinforcing layer during the combustion of the abovementioned solid propellant;

b) a combustible charge in the form of a layer lining the internal surface of the reinforced tubular case referred to hereinabove;

c) a combustion chamber delimited by the case lined in this manner;

d) an initiator for ignition of the igniter;

e) a nozzle, the diameter of which is chosen in such a manner as to maintain the desired pressure within the combustion chamber of the igniter, this nozzle being made of a material which is heat-resistant and non-consumable.

However, the ignition of the case containing the combustible charge of the igniter takes place only after the igniter has performed its function, so that the combustion of this case does not contribute to the useful thermal power of the igniter, thereby reducing the energy output and at the same time contributing to the increasing of the volume and of the weight of the igniter. Furthermore, many components are made of gas-generating organic materials, some of which are not consumable, so that this igniter has relatively large dimensions.

SUMMARY OF THE INVENTION

The object of the present invention is to provide a consumable igniter for a solid rocket motor which exhibits improved compliance with the practical requirements as compared with the previously known igniters of the same type and which does not exhibit the disadvantages of the latter set forth hereinabove.

The subject of the present invention is a consumable, especially pyrogen, igniter for a solid rocket motor, comprising:

a substantially spherical and reinforced thin case;

a combustible charge, in the form of a layer lining the internal surface of this case;

a combustion chamber delimited by the case lined in this manner;

at least one initiator for ignition of the igniter, in the form of a small container containing a charge to ignite the combustible charge of the igniter and cooperating with an ignition device for this combustible charge which penetrates into the small container;

a transfer device for the flame for initiating ignition of the igniter;

one or more sonic throats, which igniter is defined:

in that said reinforced case is made of a composite material;

in that the sonic throats consist of through-holes formed in a uniform manner in the case, as well as in the layer of combustible charge which lines the latter, along at least one circumference of the substantially spherical case of the igniter;

in that said at least one small container is received in one of said through-holes, in such a manner as to project substantially towards the center of said combustion chamber.

According to an advantageous embodiment of the igniter according to the invention, the case is constructed in the form of two half domes having a substantially hemispherical configuration and each comprising an assembly extension in the form of a substantially cylindrical skirt, said through-holes being formed in the two assembly skirts In addition to the arrangements set forth hereinabove, the invention further comprises other arrangements, which will become evident from the description which will follow.

BRIEF DESCRIPTION OF THE DRAWINGS

The invention will be better understood with reference to the supplementary description which will follow, which refers to the accompanying drawings, in which:

FIG. 3 illustrates a rocket motor 100, intended for space applications, which is equipped with the consumable igniter according to the invention, 110, and with the solid propellant 101.

Figure 1:
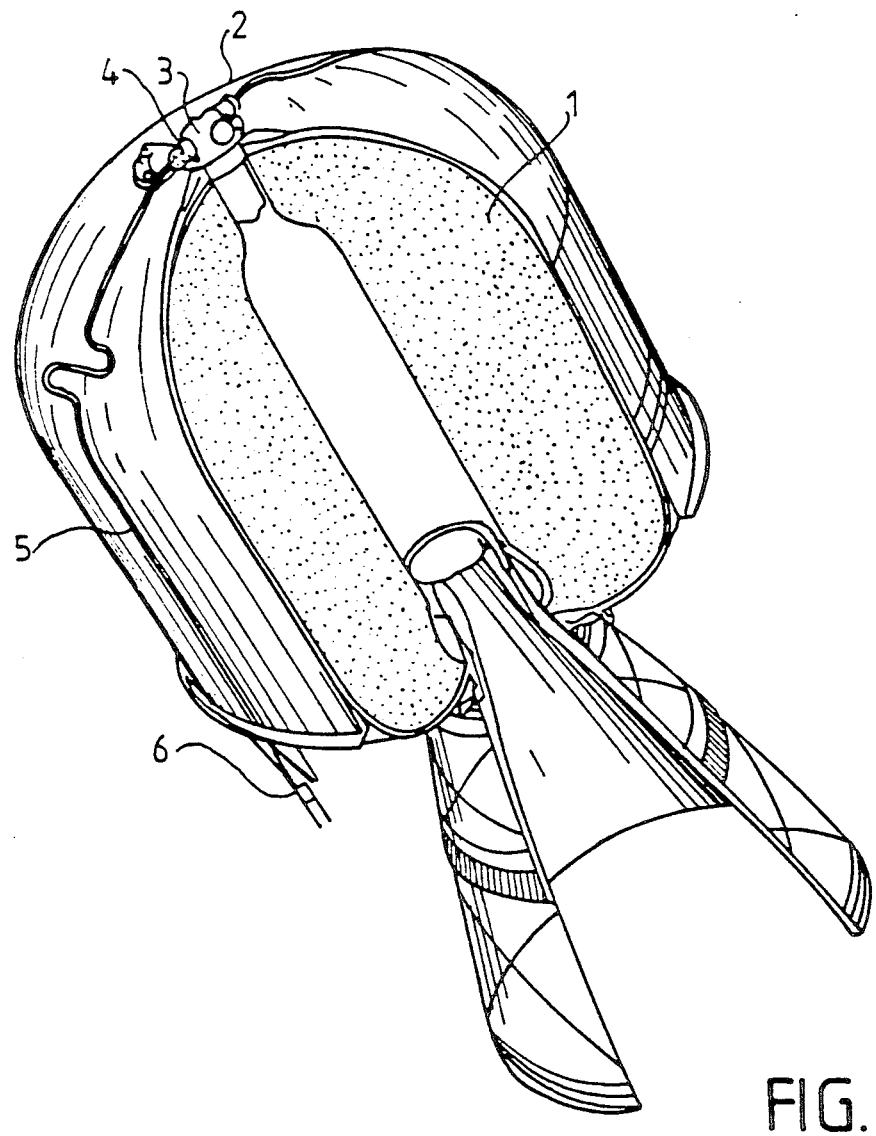
FIGS. 1 and 2 illustrate, respectively, a solid rocket motor for space applications, which is equipped with a demountable igniter, and a typical metal pyrogen igniter, which have already been described hereinabove.
Figure 2:
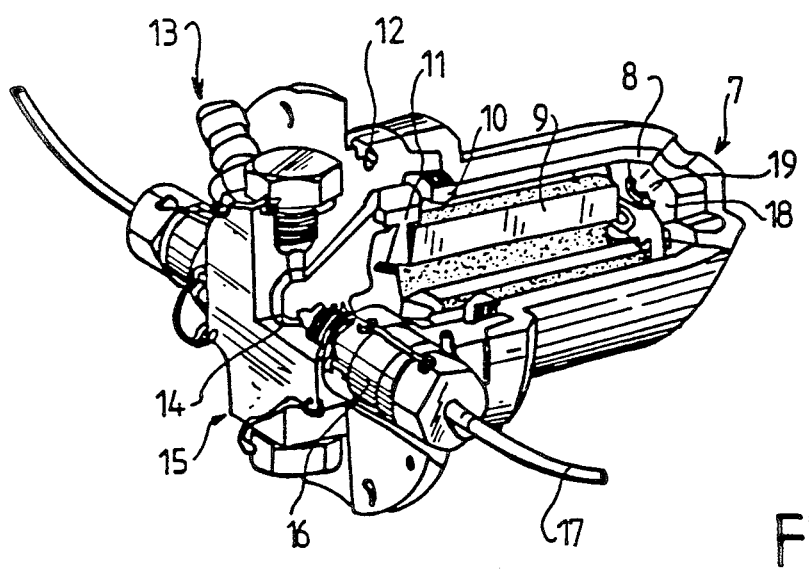
Figure 3:
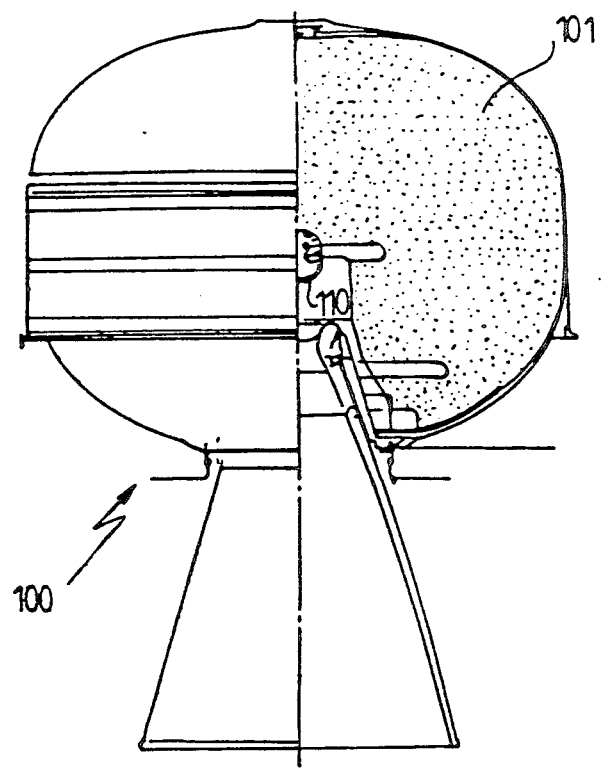
FIG. 3 illustrates a solid rocket motor, also of the type intended for space applications, which is equipped with the consumable igniter according to the present invention, the igniter being fixed to the propellant.
Figure 4:
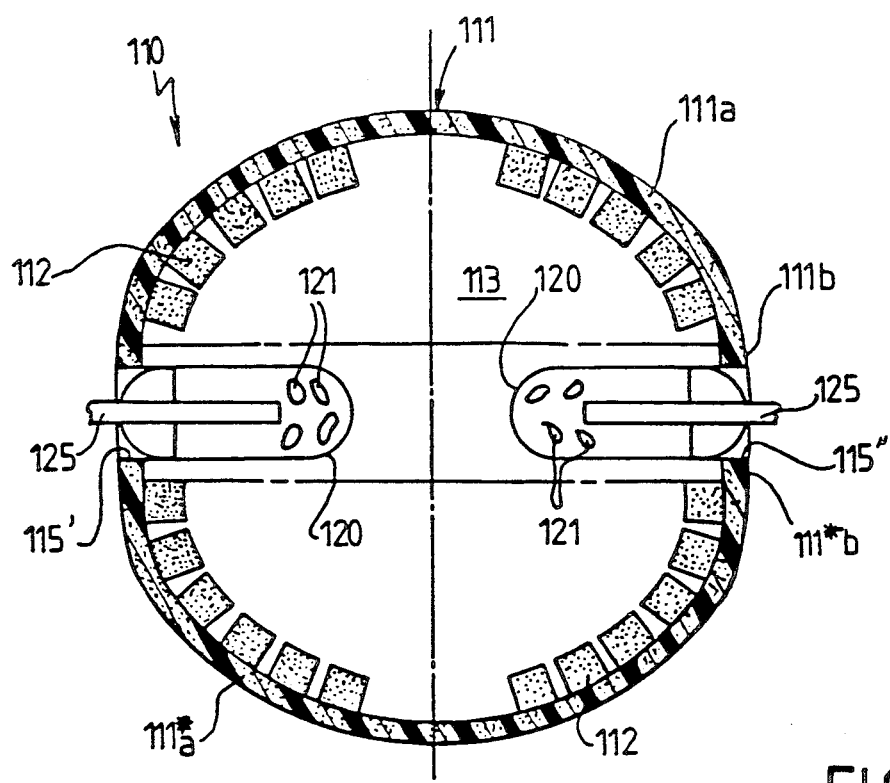
FIG. 4 shows, in diametral cross section, the igniter according to the invention.

The igniter 110 (cf. in particular FIG. 4) comprises a thin case 111 of substantially spherical shape as well as a combustible charge 112 made in the form of a layer lining the internal surface of the case 111 (which is also combustible) and delimiting a combustion chamber 113; more specifically, a combustible block is involved, comprising cylindrical projections.

The material in which the case 111 of the igniter 110 is made is a strong material, that is to say a material capable of bearing the pressure and the heat which are developed during ignition, this being so over a sufficient duration (this amounts to a very short time interval of the order of 100 to 200 ms), this material being intended to be consumed completely or reduced to small flexible fragments or again to become extremely flexible and bendable immediately after ignition.

In the application aimed at by the present invention, the case 111 consists of two substantially hemispherical half domes 111a and 111*a, each provided with an assembly extension in the form of a substantially cylindrical skirt 111b and 111*b, respectively. The present invention is not, of course, limited to this form of the half domes, given that other forms may also be adopted. The two half domes 111a and 111*a are made using composite materials, i.e. plastic materials, reinforced with reinforcing fibers, which are especially made from a carbon fiber cloth impregnated with an appropriate resin, this being the case contrary to the technical prejudice which, in practice until the present time, urged a person skilled in the art to disregard the use of composite materials in applications of this type, on account of the technical problem presented by the need for the case of the igniter not only to have to show a sufficient strength during ignition, but also not to burn in the environment, rich in combustible material, of the cavity of the rocket motor. In fact, a person skilled in the art always feared that a partially molten fragment of the plastic material making up the composite materials, in which the case of an igniter might be made, might cause the temporary blockage of the nozzle (or nozzles) (which will be described hereinbelow) and, consequently, a failure of the rocket motor. It is, of course, possible to use as a reinforcing fitting a cloth of any other fibers to produce the case of the igniter 110, provided that it is capable of withstanding the heat developed during ignition, and this being so for a time of sufficient length. In the present invention, an epoxy resin has been used as matrix, although many other resins are available for such use.

The particular form of the layer of combustible charge 112 is dependent upon the development required for the ignition pressure.

This combustible charge may consist of any appropriate composition capable of generating combustion at the desired rate and very hot ignition gases. Furthermore, the combustible charge 112 may be molded directly in the half domes 111a and 111*a or prefabricated and then mounted in the half domes or again disposed in the half domes to be subjected to a finishing treatment to create the desired form. The charge 112 of the igniter protects the internal part of its case 111 from the action of the hot combustion products which are generated during ignition, this being the case until the end of the combustion process of the igniter.

After having covered the internal part of the two half domes with the solid propellant, these two half domes are assembled with one another by bringing together their cylindrical assembly skirts 111b and 111*b so as to establish a sealed connection between the two half domes. This assembly requires the two half domes 111a and 111*a to be manufactured with a high degree of precision, since otherwise there will be no effective connection between them and undesired leakages will occur.

Figure 5:
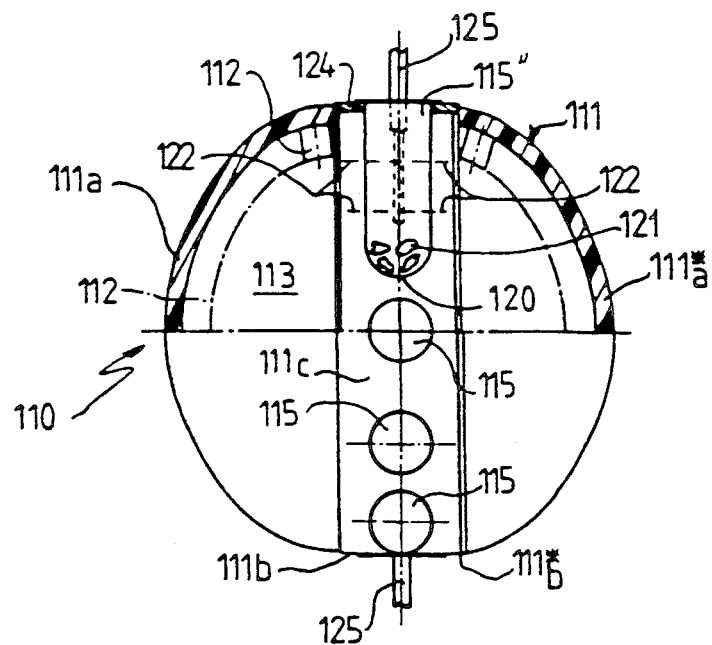
FIG. 5 is a view, in elevation and in partial cross section, of the igniter illustrated in FIG. 4, showing the arrangement of the sonic throats with which the igniter is provided.

The cylindrical skirts 111b and 111*b of the two half domes 111a and 111*a contain a plurality of recesses 115* (cf., in particular, FIG. 7), formed with precision, which correspond to one another in pairs so that, in the course of the assembly of the two half domes, each pair of recesses defines a through-hole 115. A certain number of these holes 115 regularly spaced in relation to one another, can be seen in FIG. 5. Two of these holes, 115', and 115" respectively (cf. FIG. 4) are utilized for the mounting therein of initiator devices (or initiators) for ignition of the igniter 110, which are constructed in the form of small containers 120 (cf. also FIG. 6) containing a charge 121 intended to ignite the combustible charge 112 of the igniter 110. The other holes, 115, are used as sonic throats. The sonic character of these throats permits the decoupling (at least initially) of the igniter combustion process from the combustion process of the rocket motor 100. The number of holes 115 and their dimensions are dependent upon the particular application aimed at. Before ignition, the sonic throats 115 may be covered by a membrane (not shown in the drawings) in order to facilitate the build-up of the desired pressure, while avoiding penetration by moisture, although this arrangement is not necessary in all cases.

The pyrotechnic mixture 121 contained in the small containers 120 is inflammable and may consist of BKNO3 pellets, a solid grain propellant, solid propellant chips or other suitable mixtures The small containers 120 are of substantially cylindrical shape and project towards the center of the chamber 113 of the igniter 110. These small containers each comprise small holes 122 (cf. FIG. 6) to permit the ignition of the combustible charge 112 of the igniter. The small containers may be made of a readily combustible metal, such as aluminum or magnesium, or of composite materials or of any other suitable material.

Figure 6:
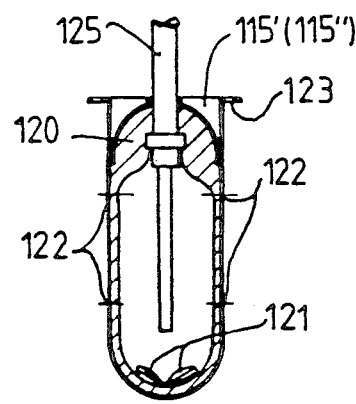
FIG. 6 is a detail view, with parts cut away, showing the location of a small container for initiating ignition of the igniter according to the invention, containing a pyrotechnic charge, especially consisting of BKNO3 pellets and cooperating with an ignition device for this charge, especially consisting of a fast burning pyrotechnic cord marketed by the American company McCORMACK SELPH under the trademark "HYVELITE"
Figure 7:
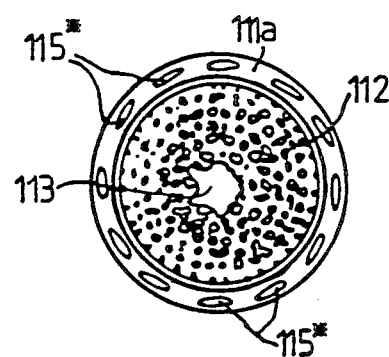
FIG. 7 is a reproduction of a photograph illustrating, in perspective, a half dome of which the igniter according to the invention is composed, seen from the side intended to be assembled with another half dome, permitting an appreciation of the combustible charge of the igniter as well as the arrangement of the sonic half throats intended to form, together with the half throats carried by the other assembly skirt, the sonic throats of the igniter.

Moreover, these small containers are connected to the cylindrical assembly skirts 111$b$ and 111*$b$ of the case 111 of the igniter 110 by means of a collar 123 (cf. FIG. 6). The charge or the pyrotechnic mixture 121 in the small containers 120 may be ignited by an initiator (ignition device) which is activated electrically, such as the standard detonator developed by NASA or similar initiators or alternatively by an explosive transfer line, such as a "HYVELITE" cord 125 of the type already referred to hereinabove (cf. FIG. 6), or any other pyrotechnic transfer means. Although in the present invention use is made of two small metal containers 120, in particular of aluminum, which are filled with BKNO3 pellets (these are disposed at two diametrically opposite positions in the zone 111$c$, which is substantially cylindrical, of the igniter 110; cf., in particular, FIG. 5, where the reference 124 designates a thermal insulator), it is nevertheless possible to use a single small container or more than two small containers. The construction of these small containers is not, of course, necessarily limited to the use of aluminum, and the pyrotechnic mixture 121 may consist of any suitable composition, as has already been stated hereinabove.

After having assembled the igniter, the latter is adhesively bonded to the block of propellant grain (propellant) of the rocket motor 100.

The igniter according to the invention may be placed at the most suitable position in the rocket motor 100. Moreover, it is possible to use a plurality of igniters to ignite the rocket motor 100, depending upon the particular requirements. After having ignited the pyrotechnic mixture 121, which is situated in the aforementioned small containers 120, by any conventional means (electrically activated initiator, flexible cord, explosive transfer line, shock wave or through bulkhead initiator, etc.), the combustible charge 112 which is inside the case 111 of the igniter 110 is ignited on account of the presence of the hot combustion products originating from the pyrotechnic mixture 121. A pressure is then established within the combustion chamber 113 delimited by the case 111 lined by the charge 112, on account of the combustion of this charge. If the membrane which has been referred to hereinabove is present, the latter is torn when the pressure and the heat have reached sufficiently high values. The hole of the throats 115 then causes the flow of the hot combustion products along these throats; this permits the ignition of the propellant 101 of the rocket motor 100.

This process is completed within a period of time less than 200 ms. from the moment of the initiation of the ignition to the moment when, in the rocket motor 100, 90% of its maximum initial pressure is reached.

The consumable igniter according to the invention has formed the subject of open-air tests with the objective of testing its behavior under ambient conditions. To this end, prototypes of the igniter in accordance with the aforegoing arrangements were connected to a slab of dummy propellant (cf. FIGS. 8 and 9).

Following this, the igniter prototypes were subjected to all the tests to which igniters intended for space applications are normally subjected, i.e. vibration and heat cycle tests.

Moreover, these prototypes successfully withstood the sealing and combustion tests.

Furthermore, igniter prototypes were successfully used to ignite a certain number of rocket motors of the type employed in this category of tests.

Figure 8:
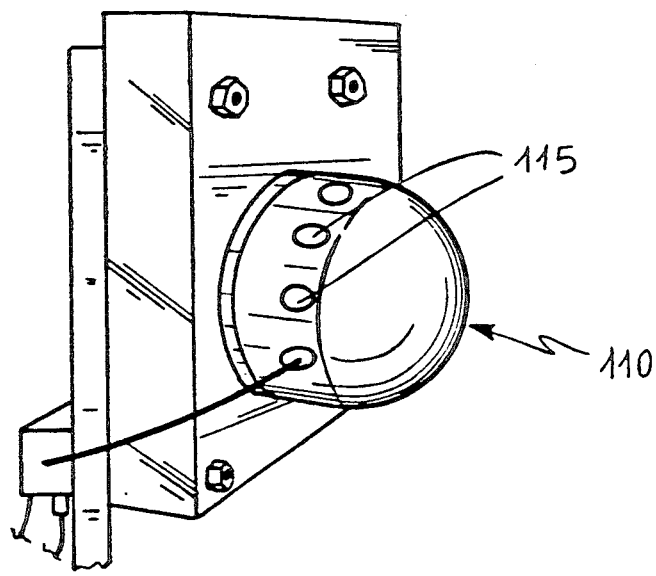
FIG. 8 is a reproduction of a photograph illustrating the performance of an open-air test with the objective of testing the behavior of the consumable igniter according to the invention under ambient conditions, after having fixed it to a slab of dummy propellant, which is in its turn fixed to a support (it is possible to distinguish a detonation device as well as sonic throats)

FIG. 8 illustrates, in the form of diagrams, the recording of the development of the pressure inside the igniter, as well as in the chamber of the rocket motor, (the points shown on the diagrams relating to the development of the pressure inside the rocket motor are surrounded by small rectangles, while the points shown on the diagram referring to the development of the pressure inside the igniter are surrounded by small triangles).

At the end of these tests, it was possible to verify that the igniter was entirely consumed and that it had not damaged the parts of the rocket motor. The ignition times were of the order of 150 ms.

Figure 9:
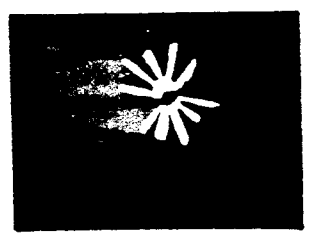
FIG. 9 is a reproduction of an image from a high speed camera sequence showing the ejection of very hot gases through the sonic nozzles (the adjective "sonic" essentially expresses the fact that the ejection of the gases reaches the speed of sound. The two diametrically opposite positions in which there is no ejection of gases correspond to the positions at which the small containers for initiating ignition of the igniter have been arranged)
Figure 10:
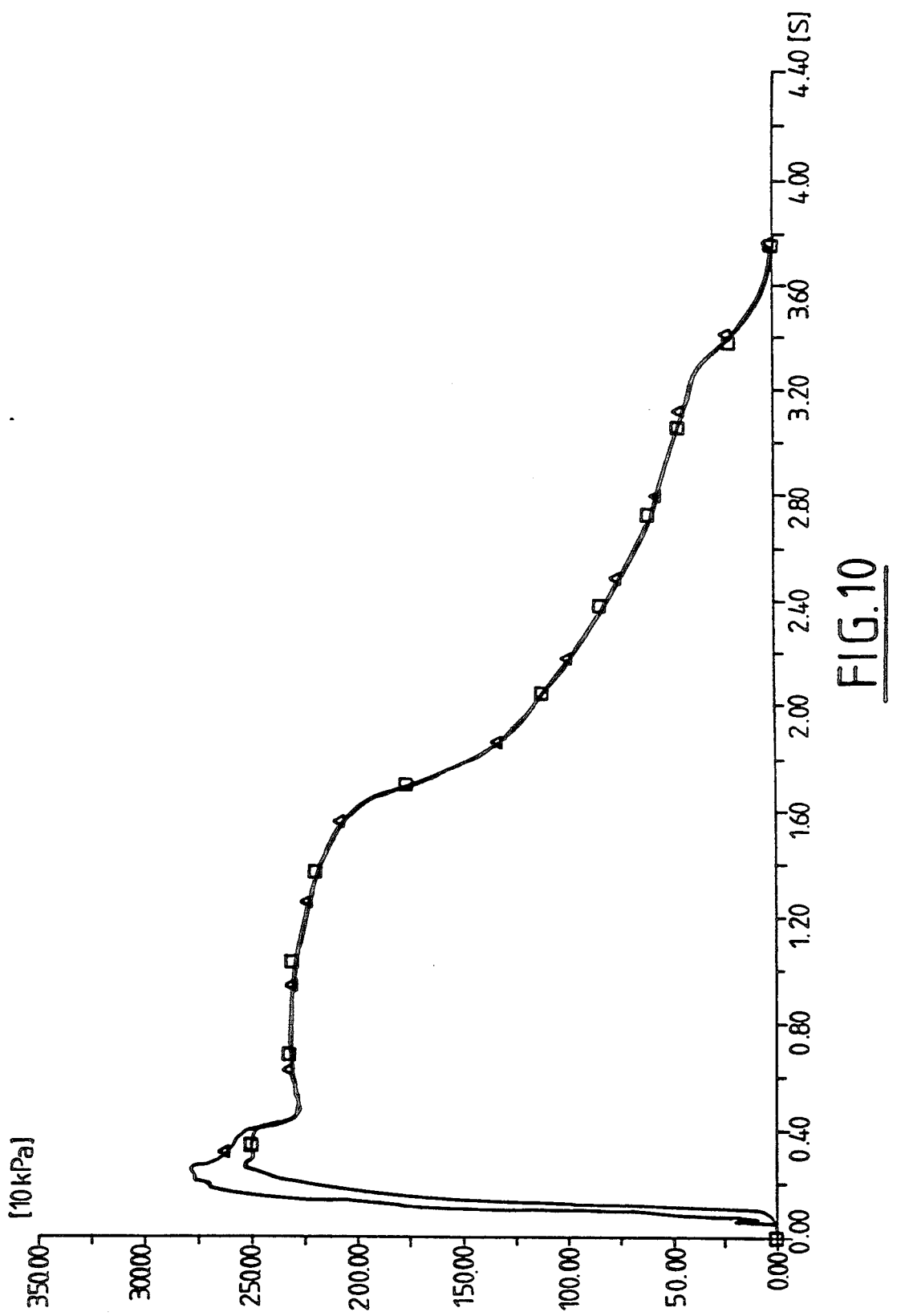
FIG. 10 is a diagram illustrating the development, with the passage of time, of the pressure inside the igniter as well as in the cavity of the rocket motor, as these quantities were recorded during a certain number of tests on the ignition of rocket motors equipped with prototypes of the igniter according to the invention.
Figure 11:
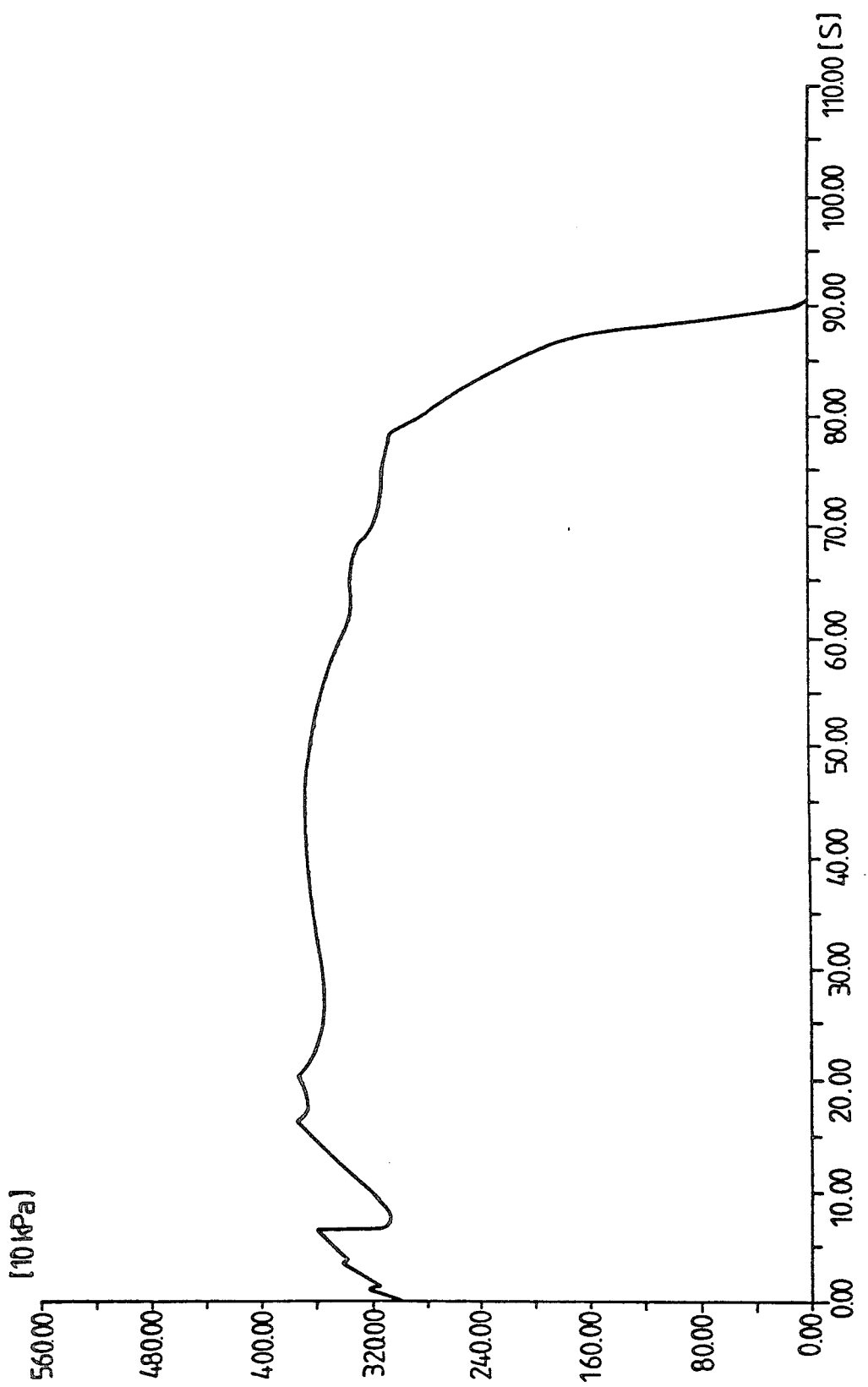
FIG. 11 is a diagram illustrating the development, with the passage of time, of the pressure within the chamber of a rocket motor for space application.

Finally, a prototype of the igniter according to the invention was used to ignite a solid rocket motor of the type identical to the motors intended for space applications, except as regards the case of this rocket motor, which was made of metal. This rocket motor, which contained 1598.6 kg of solid propellant, delivered a mean thrust of 37 kN and a maximum thrust of 44.7 kN. The maximum pressure inside the rocket motor was 4.03 MPa, while the mean pressure was 3.283 MPa. The ignition was perfect, with an ignition time of 66 ms, a value which is far below the maximum acceptable value of 200 ms. A diagram corresponding to the recording of the development of the pressure inside the solid rocket motor used in this last test is illustrated in FIG. 9.

As is evident from the aforegoing, the invention is in no sense limited to those of its modes of implementation, of construction and of application which have just been described in a more detailed manner; indeed, it covers all the variants thereof which may come to the mind of a person skilled in the art, without departing either from the area or from the scope of the present invention.

We claim:

1. A consumable igniter for a solid rocket motor comprising:
   a substantially spherical reinforced thin case constructed of two half domes having a substantially hemispherical configuration, each dome comprising an assembly extension in the form of a substantially cylindrical skirt;
   a combustible charge in the form of a layer lining the internal surface of said case, said combustible charge and said case defining a combustion chamber;

a plurality of through-holes formed through said skirts and defining respective sonic throats;

at least one small container received in one of said through-holes and projecting inwardly towards said combustion chamber, said small container containing a charge for igniting said combustible charge layer; and an ignition device penetrating into said small container for igniting the charge contained within said small container.

2. A combustible igniter for a solid rocket motor comprising:

a substantially spherical reinforced thin case;

a combustible charge in the form of a layer lining the internal surface of said case, said combustible charge and said case defining a combustion chamber;

a plurality of through-holes formed through said case and defining respective sonic throats, said through-holes being arranged in diametrically opposed pairs along at least one circumference of said case;

at least one small container received in one of said through-holes and projecting inwardly toward said combustion chamber, said container containing a charge for igniting said combustible charge layer; and an ignition device penetrating into said small container for igniting the charge contained within said small container.

* * * * *